(12) United States Patent
Garg et al.

(10) Patent No.: US 10,181,255 B2
(45) Date of Patent: Jan. 15, 2019

(54) BROADCAST MODE FOR NON-PAIRED DEVICES AND CRITICAL MESSAGES

(71) Applicant: SEARS BRANDS, L.L.C., Hoffman Estates, IL (US)

(72) Inventors: Parag Kumar Garg, Woodinville, WA (US); Peter Christopher Mullen, Seattle, WA (US); Joseph Reid Baird, Sammamish, WA (US)

(73) Assignee: Sears Brands, L.L.C., Hoffman Estates, IL (US)

( * ) Notice: Subject to any disclaimer, the term of this patent is extended or adjusted under 35 U.S.C. 154(b) by 7 days.

(21) Appl. No.: 15/295,822

(22) Filed: Oct. 17, 2016

(65) Prior Publication Data

US 2018/0108246 A1  Apr. 19, 2018

(51) Int. Cl.
*G08B 1/00* (2006.01)
*G08B 25/10* (2006.01)
*G08B 21/18* (2006.01)

(52) U.S. Cl.
CPC ............ *G08B 25/10* (2013.01); *G08B 21/18* (2013.01)

(58) Field of Classification Search
CPC ................................. G08B 25/10; G08B 21/18

USPC ............. 340/539.1, 539.11, 539.13, 506, 3.1
See application file for complete search history.

(56) References Cited

U.S. PATENT DOCUMENTS 5,400,246 A * 3/1995 Wilson .................... G06F 3/023
340/12.53

OTHER PUBLICATIONS

International Patent Application No. PCT/US2017/57046; Int'l Search Report and the Written Opinion; dated Nov. 9, 2017; 9 pages.

* cited by examiner

*Primary Examiner* — Daryl Pope
(74) *Attorney, Agent, or Firm* — Baker & Hostetler LLP

(57) ABSTRACT

Methods are described for raising an alarm from an sensor device that is not paired with a sensor network using a broadcast mode. Embodiments at a sensor device include determining that data from a sensor of a sensor device indicates an alarm state, determining that the sensor device is not paired with a hub; and sending a broadcast message to a network. Embodiments at a hub for a sensor network include receiving an alarm message from a sensor device in a broadcast mode wherein the sensor device is not paired the hub; forwarding the alarm message to an alert service; receiving confirmation of the authenticity of alarm message; and generate an alert.

20 Claims, 9 Drawing Sheets

BROADCAST MODE FOR NON-PAIRED DEVICES AND CRITICAL MESSAGES

BACKGROUND

An area such as a building, residence, or office, may be protected with sensors distributed around a protected area. For example, a smoke sensor may be placed on the ceiling of several rooms in the building to detect fire in those rooms, or a water sensor may be placed under sinks to detect a leaking plumbing. When smoke or water is detected by a sensor, the sensor device may indicate an alarm condition, for example, with flashing lights or a loud sound emanating from the sensor device itself.

Some sensor systems communicate the sensor readings or alarm to a central location that may log the readings or sound a central alarm. A central alarm system, located at the premises of the areas protected by the sensor network, may allow an alarm to be enabled or disabled at a single central point for the entire premises. Where there are multiple sensors, a network of sensors may be connected to central alarm system. With a sensor network, a central alarm can cause alarm lights and sounds to emanate from all sensor devices when an alarm condition at only one sensor device is detected. In addition to sounding a local alarm, a central alarm system may notify an alert service, which may in turn notify local police or fire department. Generating an alert may, include generating a audio or visual indicator such as an alarm and may also include notifying an owner or resident of the area via a phone call or text message. Communication between sensors and the owner or local emergency services may be via a sensor hub and/or an service provider. Communication between sensor devices, a central hub, and an service may include physical wiring dedicated to the system, a wired or wireless computer network, or a telephone network.

DETAILED DESCRIPTION OF ILLUSTRATIVE EMBODIMENTS

Figure 1:
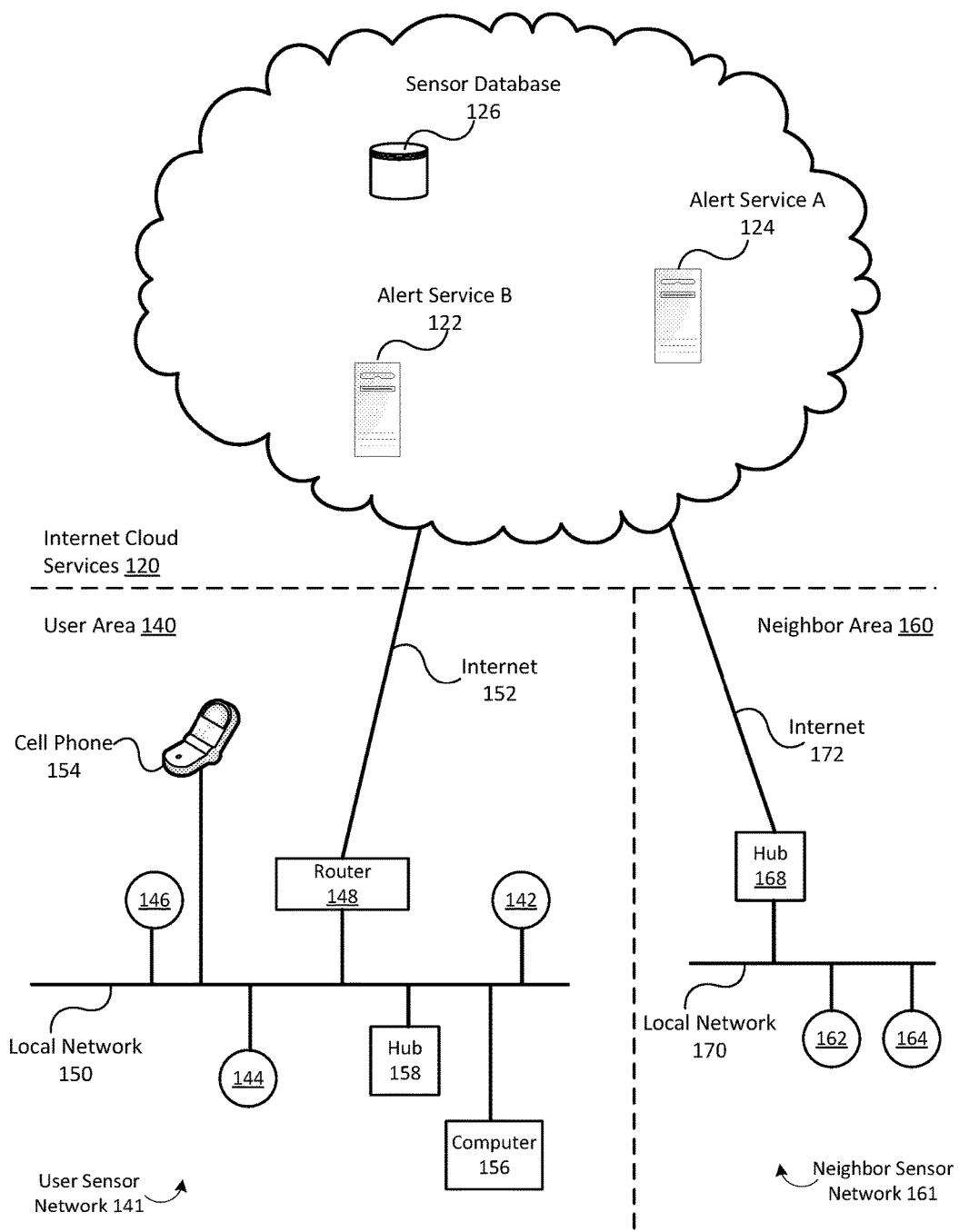
FIG. 1 depicts an example environment for some embodiments.

A sensor networks often require pairing between sensors and an system hub, but in practice, the pairing is not always correct. Many communication systems include a method for pairing communication endpoints, for example for the security of the network and endpoints, or simply to associate one endpoint with multiple possible other endpoints. In sensor networks and systems, for example, a sensor may be paired with a hub or an service. Pairing can ensure the privacy and integrity of sensor and data transmitted to or from the sensor, and can also ensure that the correct hub or service receives messages from a sensor when there is more than one hub or service available. For example in a home with wireless communication between a sensor and a hub, it is generally desirable to generate an alert via the hub in that location and not sgenerate via the hub a neighbor's home. However, for various reasons, a sensor may detect an environmental condition when the sensor device is connected to a network but not correctly paired with a particular hub or service to pass information to about the detected condition. When the condition is urgent, for example in the case of an adverse environmental condition such as when a fire or flood is sensed, privacy may not be as important as an urgent response by any person or device that can receive an process the information about the condition. Some embodiments herein include use of a communication network in a broadcast mode when communication with a paired device or service is not possible. In broadcast mode, a sensor device can attempt to notify any other device on a network that might be capable of responding to the processing the information or sending a message to a service when the sensor's designated hub is not known or appears to be unreachable.

In a cost-constrained sensor network, the sensor devices themselves may have limited functionality, with some functions only enabled in a hub or other network device. A well protected area often includes many sensors distributed throughout the area, for example a smoke detector in every room and a water detector under every sink. The need for many sensors can impose several design constraints on the sensor devices, including cost, ease of configuration and maintenance, and battery life. These design constraints may preclude sensor devices from including the ability to, for example, generate an audio or visual indicator itself or contact an service, instead relying on a sensor hub or other device to do these functions.

Sensor power source is one such design constraint. For example, the best location for monitoring may not always be near a power outlet. The best location to monitor for a water leak is where the water is likely to be leaking, such as under a sink, and there may not be a power outlet underneath the sink. Furthermore, an system may ideally continue working when the wall power in the premises is out. Battery powered sensor devices addresses these problems, but a design with extremely low power consumption is necessary for a sensor that can operate reliably for years without requiring a battery change. Such a design may preclude every sensor device from including a traditional computer network interface or cellular communication electronics. Instead, a sensor hub or device that includes higher-cost and higher-power electronics can be combined with many low-cost and low-power sensors. A low-power sensor device may include, for example, a low-power wireless transmitter with the ability to communicate only in a small radius. Power requirements of a sensor device may be even further reduced by forgoing two-way communication, instead limiting the sensor device to one-way communication with a hub. With a transmit-only radio, a sensor device has no need to continuously power a wireless receiver waiting for signaling from a remote device. For example, sensors with a 27 megahertz (MHz), 9.6 kilobits/sec (kbps) wireless transmitter with a hub receiver attached to the powerline have been shown to consume less than 1 milliwatt (mW) of electric power. Such a sensor that beacons once per minute will outlive the 10-year shelf life of a small 225 mAh coin-cell battery.

In an environment where multiple sensor hubs may coexist, for example to monitor separate but neighboring areas, sensor devices may be paired with a particular hub. However, when an event is detected, pairing information may not be current for a variety of reasons. For example, a new sensor may be added without ever having configured it. A sensor paired to one hub in one part of a building may be moved to another part of a building where it is unable to reach the hub it was paired with, or conversely the paired hub may have been moved. An old sensor that was paired when a sensor network was originally configured is replaced without pairing the new sensor. Alternately, the hub may be upgraded or replaced without completing the sensor pairing for all sensors in the premises. The likelihood that at some time pairing information will be incorrect increases as the lifetime of a sensor increases. During the 10-year lifetime of the example sensor above, incorrect pairing may seem likely at some point.

Other circumstances where a sensor may not be paired correctly include transient devices. A transmitting device, such as a sensor device, or a listening device, such as hub, may be transient. For example, a sensor inside a shipping container to monitor or protect the contents of a shipping container will want to be able to notify any hub in whatever warehouse the container is stored in. Other circumstances include devices that fall off the network or were never added to a network due to network failures, devices failures, or networks being formed after a device was activated.

In addition to generating an alert, a sensor network can be used to gather information about an area, whether or not an adverse environmental condition is present. For example, temperature can be monitored at multiple locations around a premise to better manage or control heating, ventilation and air conditioning (HVAC) systems. References to alarm or protection systems herein may include systems intended to collect environmental condition information even in the absence of an alarm condition.

In situations where an environmental condition is detected, but pairing was never done or is determined to be inaccurate, if a non-paired device can receive a broadcast message, the sensor can use the broadcast mode to raise an alarm despite the lack of current pairing information. A broadcast mode message on a communication network is a multicast, or one-to-many, message where a single source sends a message to more than one destination. A broadcast message may be sent to all potential receivers, for example by not specifying a destination address, or a broadcast message may be addressed to a subset of potential receivers. Similarly, a broadcast message may be received by all receivers on the physical medium of the network, or it may be received by only a subset of the potential receivers. A broadcast mode for environmental events may include using existing multicast mechanism, such as the beacon mode of the Bluetooth standard, or may involve a modification of existing networking standards. In some embodiments, a broadcast message may be considered a one-to-any instead of a one-to-many transmission in that the message is intended to be received by at least one (albeit unspecified) receiving device.

A broadcast mode can also be used even when network pairing appears valid. For example, normal sensor data may be sent only to paired devices, but when a critical message must be sent, a critical message may be broadcast instead of, or in addition to, sending the message to the paired device. A message may be critical, for example, if it indicates a potential threat to life or safety, or a potential problem with user experience or network management.

FIG. 1 depicts an example environment for some embodiments, including a user area 140, a neighbor area 160 and internet cloud services 120. An area such as user area 140 or neighbor area 160 may be protected or monitored by a sensor network comprising a collection of one or more sensors. The user area 140 and neighbor area 160 may be any type of neighboring or overlapping areas that are protected or monitored by a sensor network, such as a whole building, an office or apartment within a portion of a building, or just one room or floor of a multi-story home. An area is protected if the sensor network is capable of determining one or more alarm conditions in the area based on sensor input from the networked sensors. Alternately, or in addition, an area can be monitored by collecting data from the sensors of the sensor network (whether or not alarm conditions are detected).

As depicted in FIG. 1, user area 140 is protected by sensor network 141, which includes sensors 146, 144, and 142 distributed around the user area 140, and sensor hub 158. The sensors 146, 144, and 142 may each sense one or more conditions of their environment, such detecting the presence of liquid water, ambient humidity, carbon monoxide (CO), smoke, heat or temperature, audio, video, and still images. These sensors may be connected via a local network 150 to sensor hub 158, internet router 148, a computer 156, and a mobile computing device 154. Local network 150 may be any type of digital communication network, such as WiFi, Ethernet, wired powerline, wireless powerline, Bluetooth, ZigBee, Zwave, Thread, or infrared communications. In an embodiment, router 148 may connect local network 150 to internet cloud services 120 via an internet connection 152. Of course, in other embodiments, the services 120 can be localized and have at least some aspects of the services provided by local servers that are provided by an enterprise or by a combination of local servers, cloud servers, etc. For example, the localized services could be provided by a campus network for a company, school, or the like, or within a warehouse or warehouses.

Sensors 142, 144, and 146 may be paired with hub 158, and hub 158 may be paired with a service such as alert service A 124 or alert service B 122. Computer 156 may be general purpose computer, such as a laptop or desktop computer, and may be used to manage the sensor network of user area 140, including initial configuration and maintenance, for example by providing a user interface for pairing sensor 142, 144, and 146 with hub 158, pairing hub 158 with an alert service, for setting sensor conditions to be signaled as an alarm, and for determining what types of actions to take or alert messages to send in response to certain types of events. Mobile computing device, e.g., phone 154, may be the specified destination for an alarm message or other status messages from the sensor network. Such messages to mobile phone 154 may be, for example, a voice call from an alert service (e.g., automated or call from a human at the service), or a text message. If the phone 154 is a smartphone, alarm and status messages to the phone 154 may be custom electronic messages that are received by, managed by, and are presented in the user interface of, a custom application for sensor network message running on the phone 154. A custom application for phone 154 may be, for example, a web application run in the phone's web browser, or an application installed persistently on phone 154. In embodiments, the mobile computing device 154 can be a service, instead of the depicted mobile device, that is provided by an operator or a security service. That is, mobile computing device 154 is for illustration and does not necessarily need to be mobile. Additionally, the mobile computing device may represent a plurality of computing devices such as devices in possession of various members of a family.

Neighbor area 160 may correspond to an area nearby or overlapping, but separately monitored from, user area 140. For example, neighbor area 160 may be in a house next door to the house of user area 140. Alternately, user area 140 and neighbor area 160 may be neighboring apartments in an apartment building, or neighboring retail spaces in a mall. User area 140 and neighbor area 160 may also correspond to separate portions of a single residence or commercial space, for example, separate floors of a home. The neighbor area 160 may be monitored with neighbor sensor network 161 comprising sensors 162 and 164 connected to neighbor hub 168 via neighbor network 170. Hub 168 may act as an internet router and connect local network 170 to internet cloud services 120 via internet connection 172.

Internet cloud services 120 may include alert service A 124, alert service B 122, and a sensor database 126. Alert service A and alert service B may be run by competing companies, or may be run by a single company. Sensor database 126 may maintain a list of sensor identification information (sensor IDs), sensor identification information (hub IDs), and owner or other human contact information for each sensor and hub. An alert service such as alert service A 124 and alert service B 122 may use sensor database 126 to contact an owner when an alarm message is received from a sensor or sensor hub.

In other embodiments (not depicted), other network topologies for user area 140 are possible. There may be multiple networks connecting some or all of these devices within user area 140, instead of single network 150. For example, sensors 142, 144, and 146 may be connected via a wireless powerline network to hub 158, and hub 158 may be connected to router 148 and computer 156 via a wireless WiFi network. In an alternate embodiment, the sensors 142, 144, and 146 may be connected to hub 158 by way of a wired network connection. While cell phone 154 may be directly connected via a local network such as WiFi to the networked devices in user area 140, cell phone 154 may alternately be connected to a cell phone service to the Internet, and then only indirectly connected to devices in user area 140 via router 148. In other alternate embodiments, hub 148 may also serve as an internet router, bridging a local physical network with the sensors to the internet. Hub 148 may be a dedicated physical device as depicted in FIG. 1, or it may be implemented as a function of a general purpose computer, such as computer 156.

Figure 2:
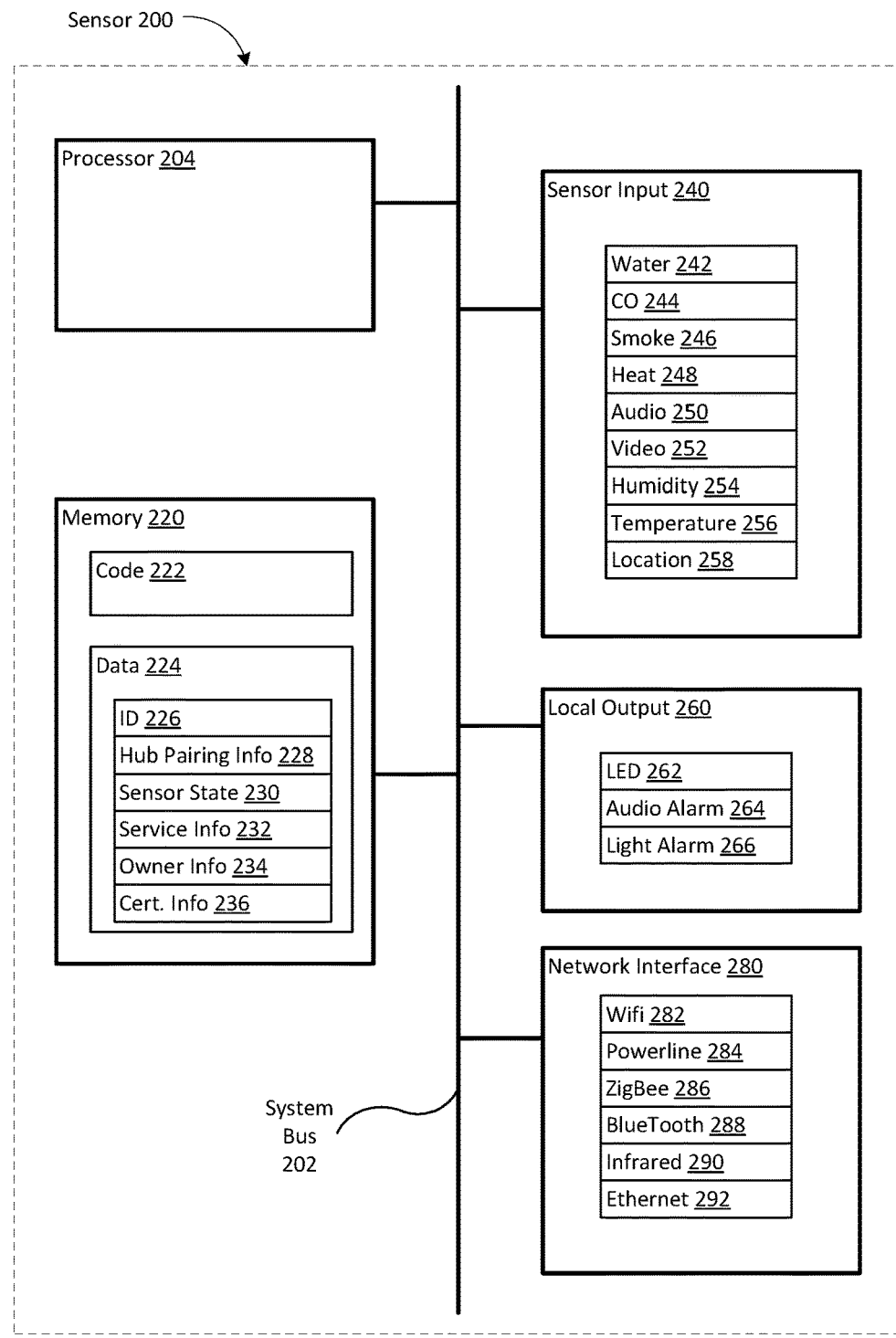
FIG. 2 is an example sensor device.

FIG. 2 is an example sensor device. Sensor 200 may represent any of sensors 142, 144, 126, 162, and 164 of FIG. 1. Sensor 200 may be a computing device that includes a system bus 202 that connects processor 204, memory 220, sensor input 240, local output 260, and network interface 280. In embodiments, sensor 200 may comprise an ASIC or the like that comprises programmable gate array or similar logic that does not require a specific computing device. Memory 220 may include volatile memory such as dynamic random access memory (DRAM) and/or non-volatile memory such as static random access memory (SRAM). Memory 220 may contain both code 222 and data 224. Code 222 may include instructions that, when executed on processor 204, will cause the sensor 200 to perform various functions described herein. Code 222 may operate on or generate data 224.

Data 224 may include an ID 226, hub pairing information 228, sensor state 230, service information 232, owner information 234, and certificate information 236, amongst other things. ID 226 may include identity information that is specific to every physical instance of a sensor, so that sensors 142, 144, 146, 162, and 164 all have different IDs. ID 226, for example, may include a universally unique identifier (UUID). ID 226 may also include an identifier representing a group of sensors, such as a group of sensors all produced by a certain manufacturer, sensors owned by a certain person or entity, sensors functional for a certain type of sensing (such as sensing water or smoke), or sensors that are all joined to a single sensor network (such as user sensor network 141 or neighbor sensor network 161 of FIG. 1). ID 226 may also include identification information for multiple of these types of identifiers. Data 224 may be stored in the clear, encrypted, hashed or some combination thereof.

Hub pairing information 228 may specify a senor hub that is associated with sensor 200. An associated sensor hub, such as hub 158 of FIG. 1, may be specified in hub pairing info 228 by, for example, a unique ID of the hub, or a network address of the hub. An associated hub may be where sensor 200 sends alarm and sensor data to. The pairing information may include information for computer network pairing or membership, such as Bluetooth pairing, or local Ethernet address of, a paired sensor hub. Sensor state 230 may include the current sensor readings as well as a history of sensor readings from sensor input 240. Service information 232 may specify a preferred alert service, such as alert service A 124 or alert service B 122. Moreover, a more universal alert service A may be used to allow devices from multiple manufacturers to register. Various hubs may be designed to send alarm messages to the universal alert service, which in turn can forward an alert message to the appropriate alert service based on predefine factors, such as a network address or URL previously registered by a manufacturer. The universal alert service can thereafter determine the proper alert service to forward the alarm message based on information contained in the alarm message such as a UUID, an indicator of the manufacturer, etc.

The service information 232 may be specified, for example, by the manufacturer when the sensor 200 is manufactured, or by a sensor owner at the time of initial configuration of a sensor network. Owner information 234 may include information about or an identifier for the owner or responsible entity for a sensor network such as user sensor network 141 of FIG. 1. Owner information 234 may include, for example, the telephone number of cell phone 154, and may be set during initial configuration of a sensor network. Certificate information 236 may include information necessary to authenticate messages sent from sensor 200, for example to prevent the impersonation of sensor 200 by nefarious actors.

Sensor input 240 may include input from all manner of sensors, such as for estimating or measuring attribute of the environment around the sensor device. For example, sensor input 240 may include the ability to estimate one or more of: liquid water 240; carbon monoxide (CO) 244, smoke 246, heat 248, audio 250, video 252, humidity 254, and temperature 256. Moreover, a sensor may also contain location information such as determined by GPS input or other means including user defined location information.

A sensor device 200 may include an optional local output 260 to provide output locally at the sensor device without relying on network interface 280. Such local output can be used, for example, during initial configuration and network setup. Local output 260 may also provide a local alarm output, for example audio alarm 264 or light alarm 266, and could also indicate device power status (on or off) or battery status, for example via a light emitting diode (LED) 262.

Network interface 280 may provide connection to one or more computer networks, such as local network 150 of FIG. 1. Such network connections generally provide two-way communication, but as described above, sensor device 200 may have one-way communication out to a computer network, for example to reduce power consumption. The types of network included in network interface 280 may include one or more wired or wireless network protocols, including but not limited to WiFi 282, powerline 284, ZigBee 286, Bluetooth 288, Infrared 290, and Ethernet 292. Powerline 284 communication may include a directly wired powerline communication where all communicating devices are plugged into connected powerlines. Powerline 284 may also include wireless-to-powerline communication where at least one device is not directly plugged in to the powerline and the powerlines act as an antenna for receiving communications from one device that is not plugged in by another device that is plugged in.

Figure 3:
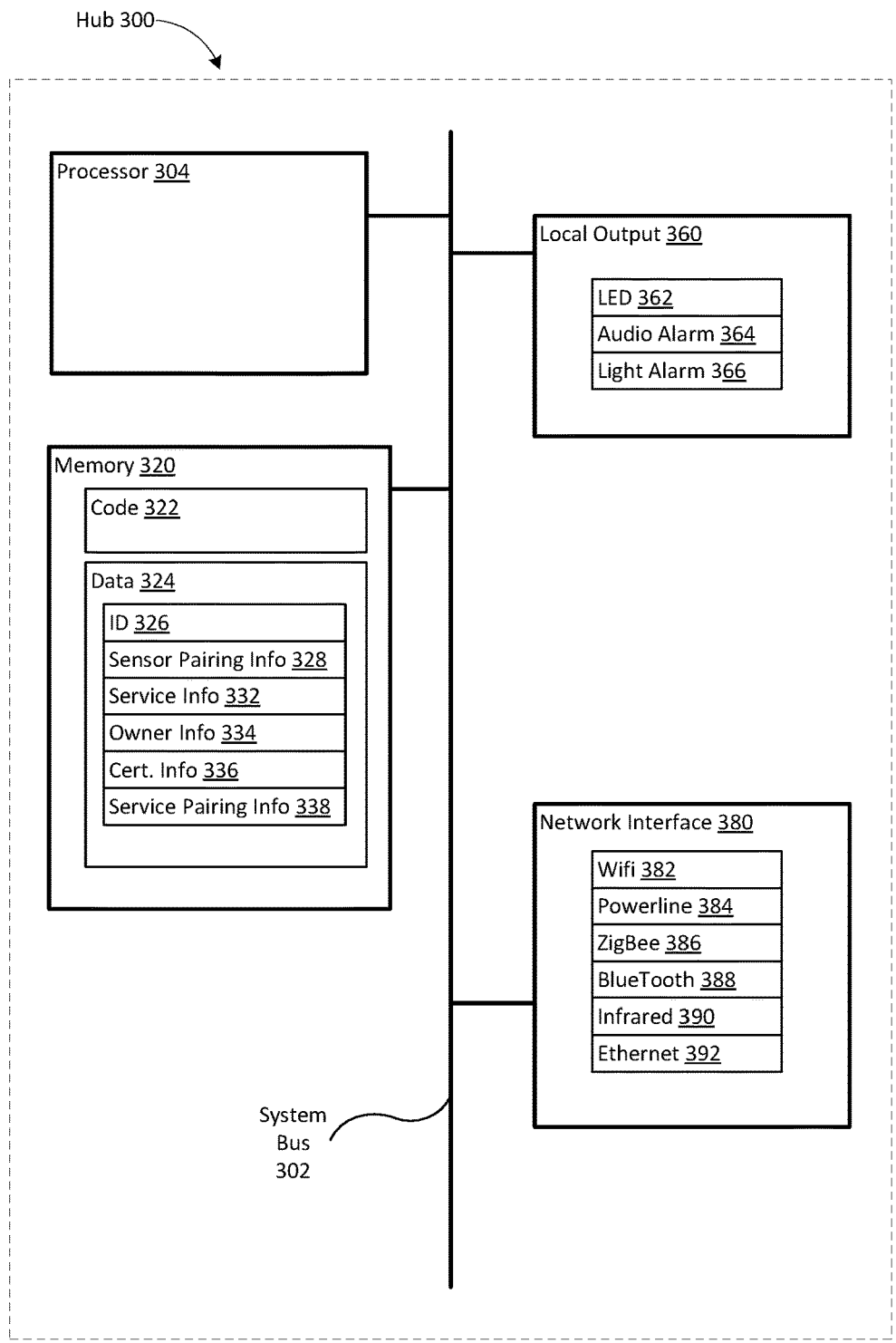
FIG. 3 is an example sensor hub.

FIG. 3 is an example sensor hub. Hub 300 may represent, for example, hubs 158 or 168 of FIG. 1. Hub 300 is a computer that includes a system bus 302 that connects processor 304, memory 320, local output 360, and network interface 380. Memory 320 may include volatile memory DRAM and/or non-volatile memory such as SRAM, flash, or a hard disk. Memory 320 may contain both code 322 and data 324. Code 322 may include instructions that, when executed on processor 304, will cause the hub 300 to perform various functions described herein. Code 322 may operate on or generate data 324. Data 324 may include and ID 326, Hub pairing information 328, service information 332, owner information 334, and certificate information 336.

ID 326 may include identity information that is specific to every physical instance of a hub, such that hubs 158 and 168 would have different IDs. ID 326 may include, for example, a UUID. ID 326 may also include an identifier representing a group of sensors paired with the hub 300.

Sensor pairing information 328 may include a list of the sensors currently paired with hub 300. A paired sensor may be specified in sensor pairing info 328 by, for example, a unique ID or a network address of the sensor. Sensor pairing information 238 may also include information for computer network pairing or membership, such as Bluetooth pairing, or local Ethernet address of, a paired sensor. Service information 332 may specify a preferred alert service, such as alert service A 124 or alert service B 122. The service information 332 may be specified, for example, by the manufacturer when the hub 300 is manufactured, or by a sensor owner at the time of initial configuration of a sensor network. Owner information 334 may include information about, or an identifier for, the owner or responsible entity for a sensor network such as user sensor network 141 of FIG. 1. Owner information 334 may include, for example, the telephone number of cell phone 154, and may be set during initial configuration of a sensor network. Certificate information 336 may include information necessary to authenticate messages sent from hub 300, for example to prevent the impersonation of hub 300 by nefarious actors.

Hub 300 may include an optional local output 360 to provide output locally at the sensor hub without relying on network interface 280. Such local output can be used, for example, during initial configuration and network setup. Local output 260 may also provide a local alarm output, for example audio alarm 264 or light alarm 266, and could also indicate device power status (on or off) or battery status, for example via a light emitting diode (LED) 262. Instead of local output, hub 300 may also rely on user output via other connected devices such as computer 156 or cell phone 154.

Network interface 380 may provide connection to one or more computer networks, such as local network 150 of FIG. 1. Network interface 380 may provide communication via, for example, WiFi 282, powerline 284, ZigBee 286, BluEtooth 288, Infrared 290, and Ethernet 292.

Figure 4:
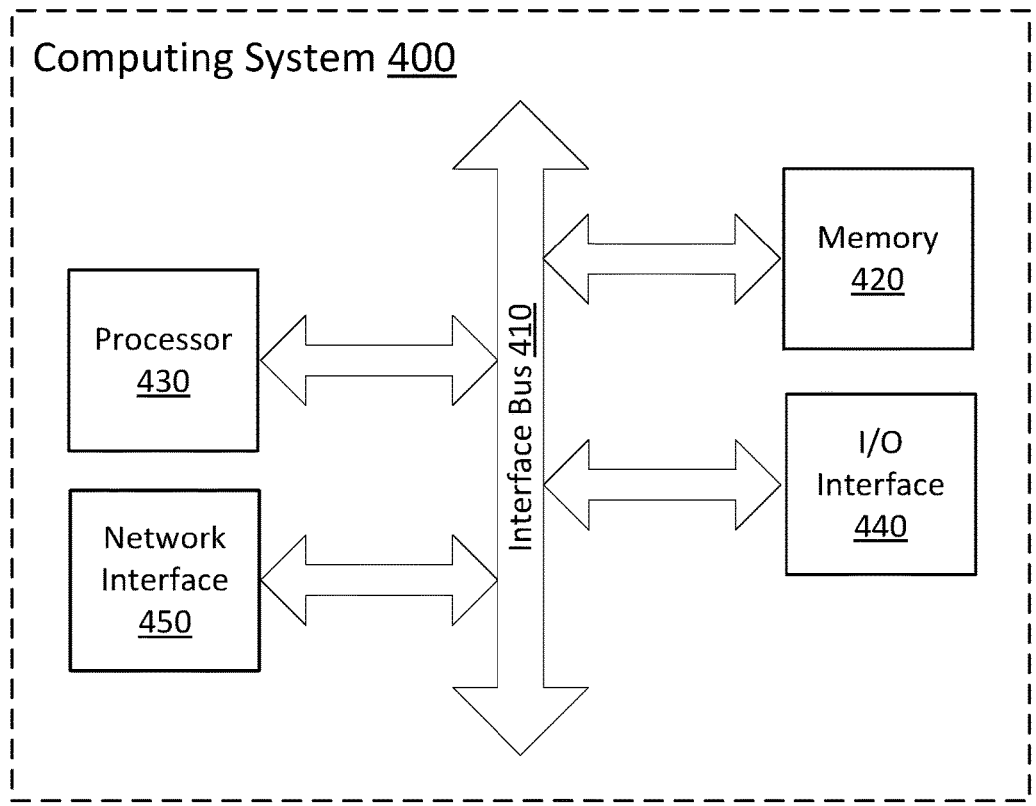
FIG. 4 is a block diagram of an example general purpose computing system 400 in which embodiments of the invention may be implemented.

FIG. 4 is a block diagram of an example computing system 400 in which embodiments of the invention may be implemented. For example, computer 156, router 148, cell phone 154, and alert services A 124 and B 122 of FIG. 1 may be implemented on system including elements of a computer system 400. As depicted, computing system 400 includes bus 410 that directly or indirectly couples at least the following components: memory 420, one or more processors 430, I/O interface 440, and network interface 450. Bus 410 is configured to communicate, transmit, and transfer data, controls, and commands between the various components of computing system 400.

Computing system 400 typically includes a variety of computer-readable media. Computer-readable media can be any available media that is accessible by computing system 400 and includes both volatile and nonvolatile media, removable and non-removable media. Computer-readable media may comprise both computer storage media and communication media. Computer storage media does not comprise, and in fact explicitly excludes, signals per se.

Computer storage media includes volatile and nonvolatile, removable and non-removable, tangible and non-transient media, implemented in any method or technology for storage of information such as computer-readable instructions, data structures, program modules or other data. Computer storage media includes RAM; ROM; EE-PROM; flash memory or other memory technology; CD-ROMs; DVDs or other optical disk storage; magnetic cassettes, magnetic tape, magnetic disk storage or other magnetic storage devices; or other mediums or computer storage devices which can be used to store the desired information and which can be accessed by computing system 400.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, communication media includes wired media, such as a wired network or direct-wired connection, and wireless media, such as acoustic, RF, infrared and other wireless media. Combinations of any of the above should also be included within the scope of computer-readable media.

Memory 420 includes computer-storage media in the form of volatile and/or nonvolatile memory. The memory may be removable, non-removable, or a combination thereof. Memory 420 may be implemented using hardware devices such as solid-state memory, hard drives, optical-disc drives, and the like. Computing system 400 also includes one or more processors 430 that read data from various entities such as memory 420, I/O interface 440, and network interface 450. In particular, each of devices computer 156, router 148, cell phone 154, and alert services A 124 and B 122 would store computer readable instructions in memory 420 that upon execution by one or more processors 430 would reconfigure the device into a specific specialized device.

I/O interface 440 enables computing system 400 to communicate with different peripherals, such as a display, a keyboard, a mouse, etc. I/O interface 440 is configured to coordinate I/O traffic between memory 420, the one or more processors 430, network interface 450, and any peripherals. Network interface 450 enables computing system 400 to exchange data with other computing devices (e.g. sensors 142, 144 and 146, hub 158, computer 156, cell phone 154, and alert services A 124 and B 122 of FIG. 1) via any suitable network (e.g. networks 150 and 170 and Internet 152 of FIG. 1).

Figure 5:
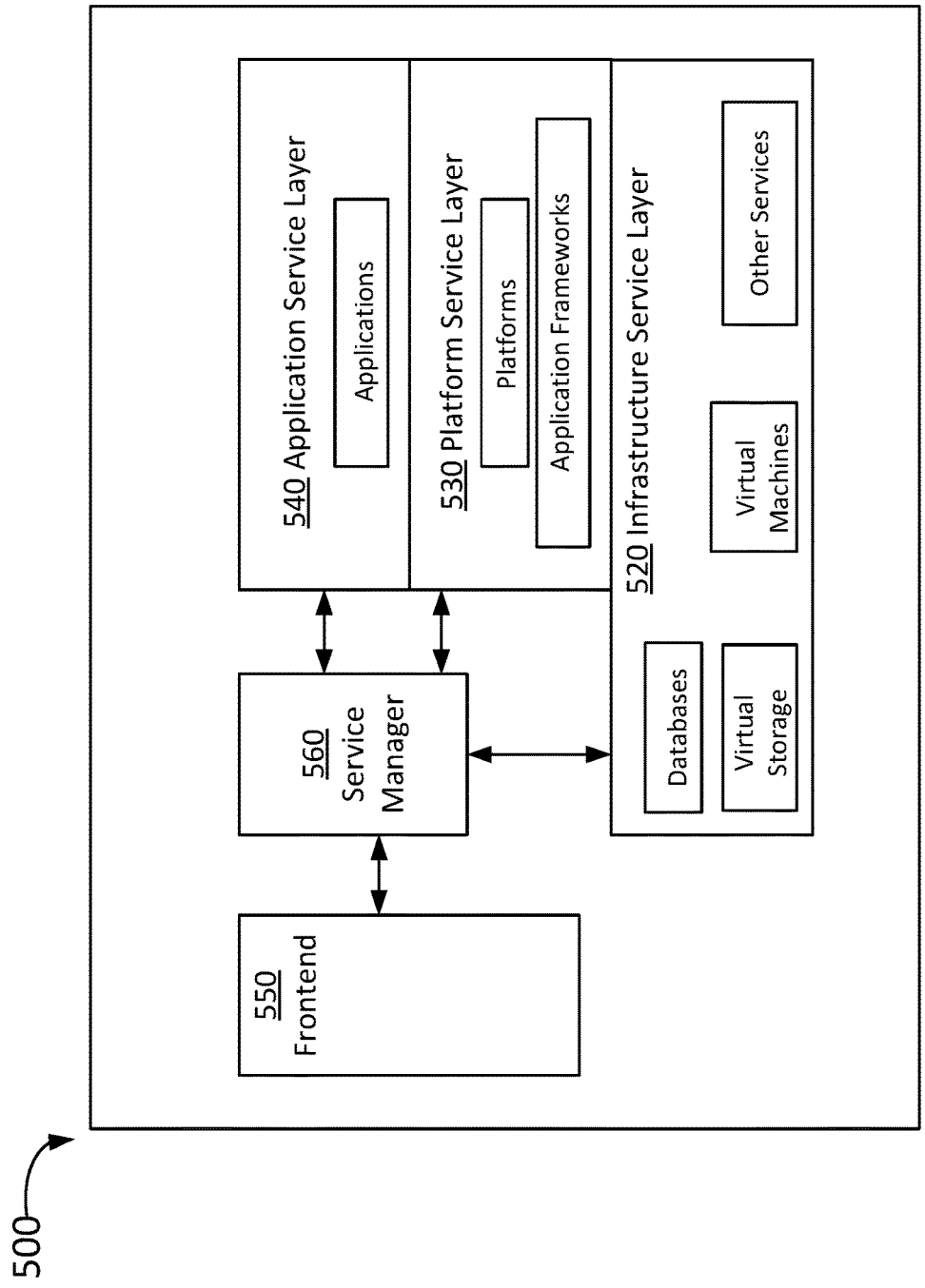
FIG. 5 is a schematic diagram illustrating an example cloud-based server 500 that may be used in accordance with the present disclosure.

FIG. 5 is a schematic diagram illustrating an example cloud-based server 500 that may be used in accordance with the present disclosure. Cloud-based server 500 may provide infrastructure services, platform services, and software application services. In an embodiment, cloud-based server 500 is used to implement at least a portion of alert service A 124 and B 122 of FIG. 1. The infrastructure services may include virtualized resources, such as virtual machines, virtual storage, and so on. The infrastructure services may also include virtualized services, including database services such as sensor database 126 and others. Each of these infrastructure services may be deployed in an infrastructure service layer 520. Although FIG. 5 depicts this as a cloud service, the system may in the alternative be on premises or a mix of cloud and on premises.

The scale and various aspects, such as data, connectivity, and dependency relationships within and between service components, of an infrastructure service deployment may be configurable by an administrator user. For instance, an administrator user may submit a configuration specification to cloud-based server 500 via a frontend interface 550 and service manager 560. The configuration specification can be translated into infrastructure and kernel level API calls that create, re-create, move, or delete components such as virtual machines and services, and assign or change attributes of the components.

In addition to the infrastructure services, cloud-based server 500 may also provide platform services, such as an environment for running virtual machines or a framework for developing and launching a particular type of software applications. Platform services may be implemented in a platform service layer 530 over the infrastructure service layer 520, and may employ one or more infrastructure services configured in a particular manner. Configuration of platform services can be accomplished by program code written according to the APIs of the platform services and, optionally, the APIs of the infrastructure services that are employed in enabling the platform services.

In some examples, cloud-based server 500 may also provide software application services in an application service layer 540. A software application can be installed on one or more virtual machines or deployed in an application framework in the platform service layer 530. The software application can also communicate with one or more infrastructure service components, such as databases, in the infrastructure layer 520. The installation and configuration of the software application in the application service layer 540 can be accomplished through APIs of the software itself and the APIs of the underlying platform and infrastructure service components.

Depending on the type of services, a cloud-service user may be granted different levels of control in configuring the services. For example, if a software application service is employed, an administrator user is given control over how the software application is configured. If a platform service is employed, an administrative user is given control over how the platform and/or application frameworks are configured. Similarly, if infrastructure services are employed, an administrative user is given control over the particular infrastructure services employed.

Figure 6:
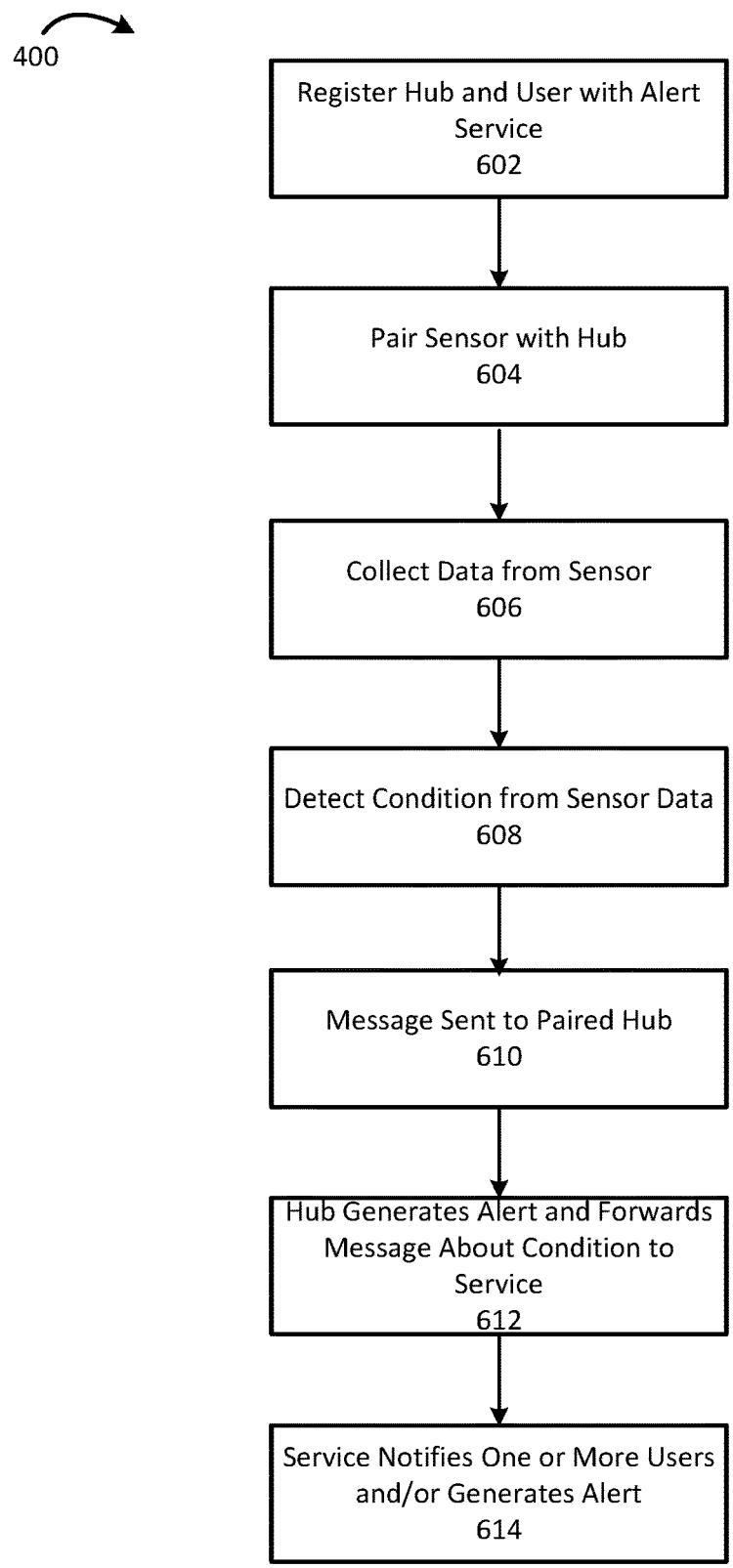
FIG. 6 is a flowchart depicting an example overall process when devices are correctly paired.

FIG. 6 is a flowchart depicting an example overall alarm process when devices are correctly paired. Starting with an unconfigured sensor network, in step 602, the hub, such as hub 146 of FIG. 1, and user or sensor network owner are registered with an alert service, such as alert service B 122. In step 604, a sensor device, such as sensor 146, is pair with the hub over a network connecting the sensor and device. In an alternate embodiment, steps 602 and 406 may be performed in reverse order. In step 606, sensor data is collected from the sensor in the sensor device. At some point after that, an environment condition or event may be detected from the collected sensor data in step 608. An event can be detected, for example by testing a sensor data sample against a threshold, but many alternate and complex alarm detection algorithms using sensor data are possible. After a condition is detected, a message may be sent to the paired hub in step 610. In step 612, the hub may optionally generate some form of alert itself, for example by emitting an alarm sound or a generating a light indictor from the hub device itself, and the message may be forwarded to the alert service.

The alert service may then notify the user or owner, for example, by sending a text message to the user's cell phone, such as cell phone 154. In an embodiment, the alert service may notify instead of or in addition to the user or owner, law enforcement, a security service, a property manager, and so. An alert service may also take other actions depending on the type of alarm and the type of service the user registered for with the service. For example, the alert service may call a police or fire department local to the registered sensor network.

Figure 7:
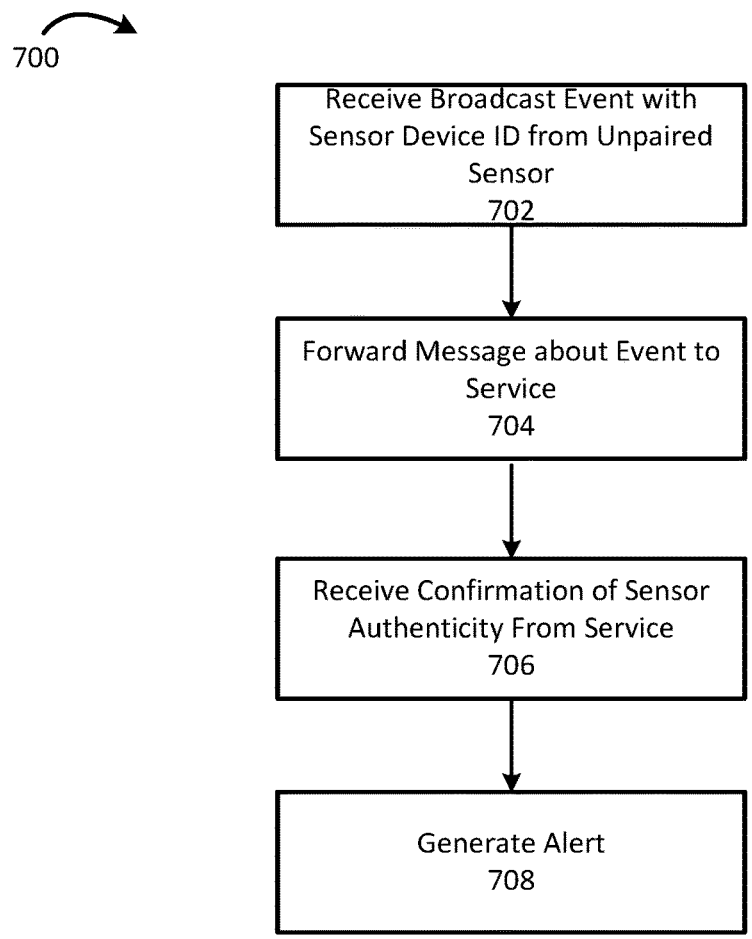
FIG. 7 is a flowchart depicting an example process at a hub for an unpaired sensor.

FIG. 7 is a flowchart depicting an example alarm process at a hub that detects a first messages from sensor devices that is not paired with the particular hub. In other words, the sensor may or may not be paired with another hub. If the particular hub receives an event message, it may determine that the message should be sent to a service. The message may be simply repackaging the event message into a second message wrapped in the appropriate network protocol and transmitting the second message to the service. In the alternative, the forwarding may entail deciphering part of the event information and adding part of the event information into the second message along with additional information such as the signal strength of the event signal, the general location of the receiving hub, the time that the event message was received, etc.

The process 700 may be performed by a hub of a sensor network, such as hub 158 or 168 of FIG. 1 (or by any device suitable equipped to perform the processes of detecting and forwarding). In step 702, a hub receives a broadcast event from an unpaired sensor device. The broadcast event message may include an ID, such as ID 226 of FIG. 2, that uniquely identifies the sensor from which the event message came. Furthermore, the unknown sensor device may provide an identify certificate, such as certificate info 234, that can be used to securely verify the identity of the sensor device. Such a certificate may be provided in the original sensor message, or upon secure request by the hub. Since the hub does not recognize the sensor device, or at least has not been specifically configured to monitor that sensor device, the hub may attempt to aid with unknown sensor's urgent message anyway by forwarding the message or some part of it to a service in step 704. The ID and/or identity certificate may be forwarded to the service along with the message in step 704. When a confirmation of the sensor's authenticity is received by the hub from the alarm service in step 706, then hub may then generate an alarm, such as a local audio alarm, in step 708.

As indicated, forwarding of the message to the alert service may comprise extracting the payload or parts of it and reformatting the content into a format compatible with a protocol usable by the service. For example, if the event message is received by way of a bluetooth wireless protocol, the hub may remove the payload and insert the payload into, e.g., an TCP/IP packet that is addressed to the alert service. Thereafter the hub may establish a connection with the alert service to send on the new packet containing the payload. If the original payload (or a portion of it) is encrypted, the hub may pass along the encrypted packet. In some embodiments, the hub may have the capability of examining the contents of the payload and may make decisions based thereon or providing its own encryption or hashing of the message. For example, the hub may determine to directly sound an alarm based on information contained in the payload.

Figure 8:
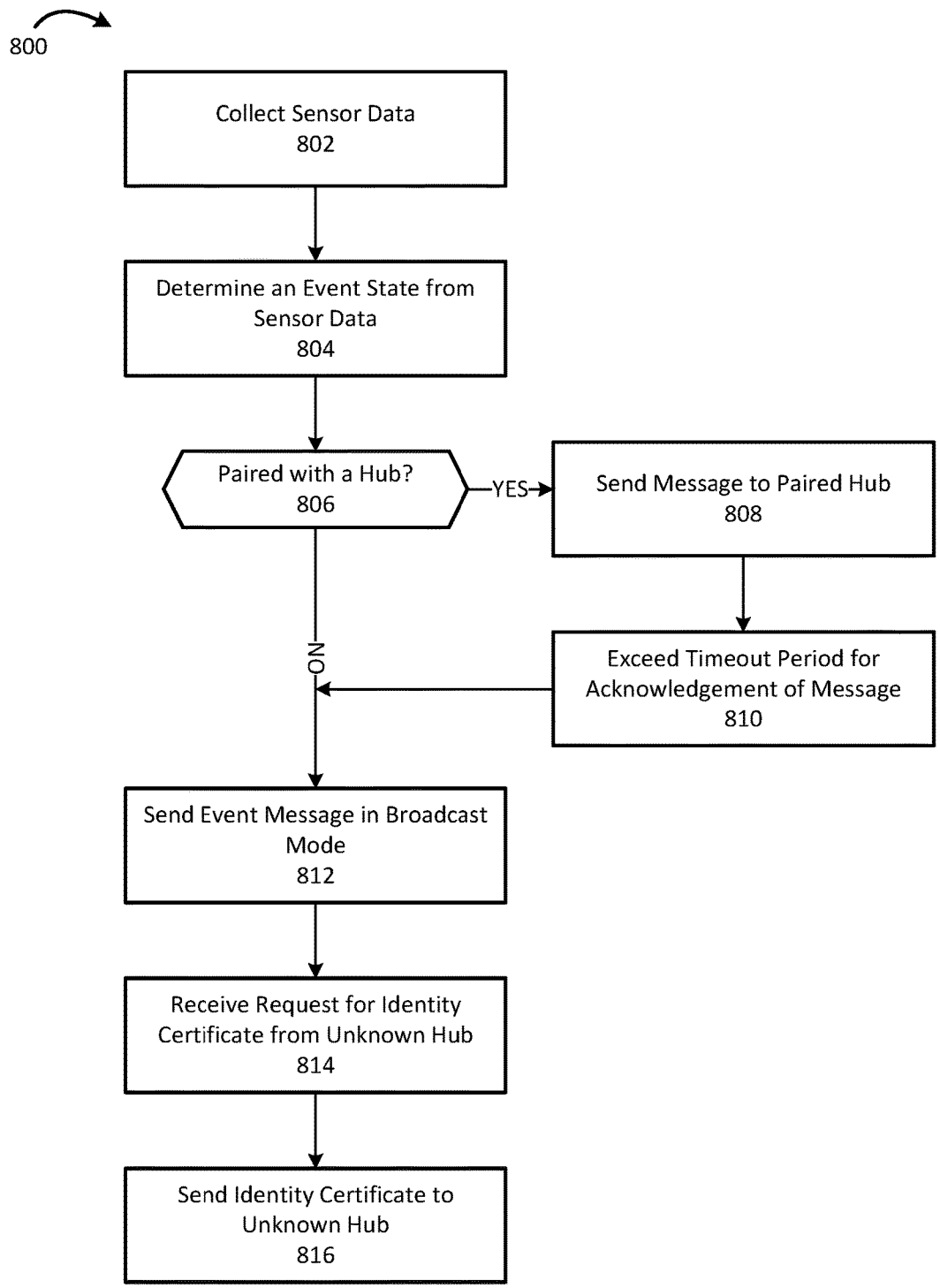
FIG. 8 is a flowchart depicting an example process at sensor device.

FIG. 8 is a flowchart depicting an example process at a sensor device, whether paired or unpaired. Process 800 may be performed by a sensor such as sensor 146 of FIG. 1. In step 802, a sensor device collects data from its sensor. In step 804, the sensor device determines an adverse environmental condition exists based on the sensor data, for example because sensor detected an event state or a sample exceeded an alarm threshold. In step 806, if the sensor device is not currently paired with a sensor network hub, control moves on to step 812. However, if the sensor is currently paired, in step 808 the sensor device will attempt to send a message with a normal network protocol (not in broadcast mode) to the paired hub. When, in step 810, an acknowledgement of the message is not received at the sensor device from the paired hub within an acknowledgement period, control moves on to step 812 anyway. In step 812, the message is sent in broadcast mode to any or all networks the sensor device is connected to. In step 814, the sensor device may receive a request from an unknown hub for a secure identify certificate. In step 816, the identify certificate is constructed or retrieved from a memory store, and is sent to the unknown hub.

In some embodiments, during various conditions such as time critical environmental conditions are detected, a sensor may go into broadcast mode regardless of pairing state. For instance, in some situations, e.g., a fire, flood, a break in detection, etc., a sensor may want to insure the maximum likelihood that a message is received by the appropriate alert service. For instance, although a sensor is paired with a hub, the sensor may not be able to determine or may have no information concerning the state of a particular hub, e.g., whether the hub itself is offline and unable to communicate. In such situations, the sensor may use the broadcast alarm message instead of or in addition to its normal protocol. Moreover, the sensor may broadcast the alarm message using one or more wired or wireless protocols in order to maximize the likelihood that one or more hubs receive the message and act upon it.

Figure 9:
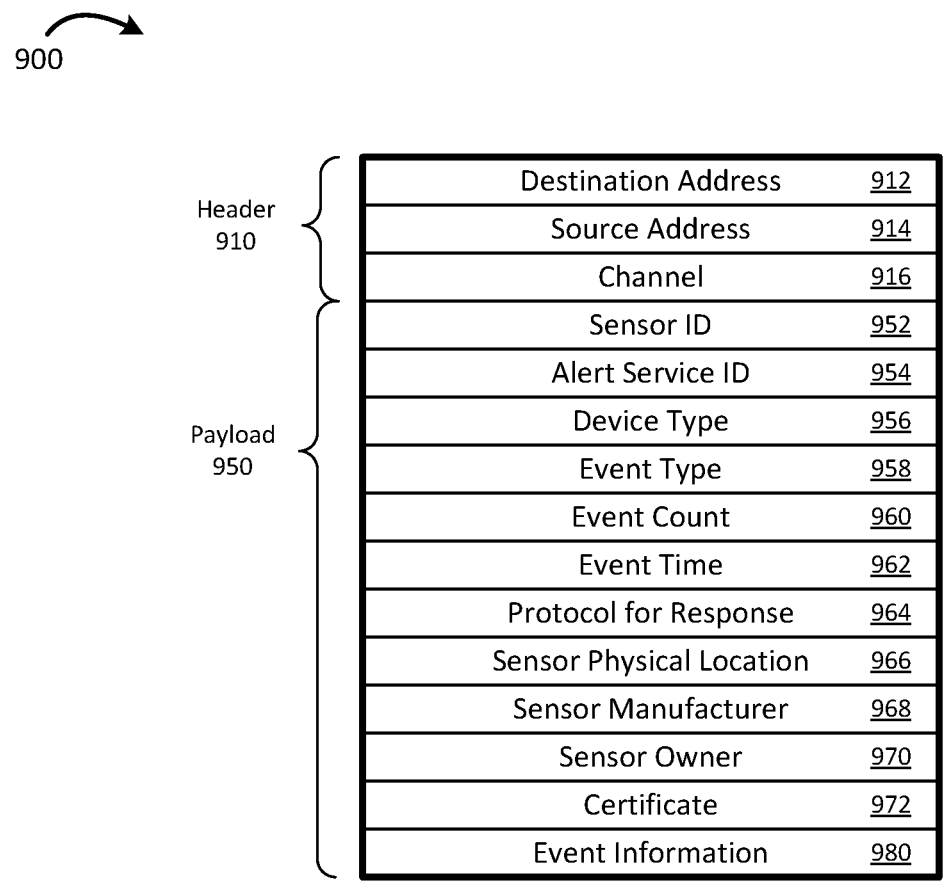
FIG. 9 is an example broadcast packet data format.

FIG. 9 is an example broadcast packet data format. Data packet 900 indicates a format of information elements that may be included in a broadcast message, such as the message sent in broadcast mode in FIG. 8. The packet 900 may be sent from an originating sensor when it senses that an event has occurred. For example, a heat sensor may send a packet 900 to indicate when a high-temperature event occurs. Packet 900 includes a header 910 and a payload 950. Elements of the packet 900 may be encrypted, for example, some or all payload elements may be encrypted, to ensure privacy and integrity of the sensor owner's information contained in the packet 900. Header 910 may not be encrypted to enable untrusted intermediaries, such as network routers or unpaired sensor hubs, to aid in delivery of the encrypted payload to the correct destination. In the embodiment of FIG. 9, header 910 may include information elements indicating: a destination address 912, a source address 914, and a channel 916. Payload 950 may include information elements indicating: a sensor ID 952, alert service ID 954, device type 956, event type 958, event count 960, event time 962, protocol for response 964, sensor physical location 966, sensor manufacturer 968, sensor owner 970, certificate 972, and event information 980. Other embodiments of a broadcast message may have additional or fewer elements, and may be ordered differently.

Header 910 may be formatted according to the packet format requirements of a network the packet 900 will be sent over, such as local network 150 of FIG. 1. In the embodiment of format 900, the header 910 includes a destination address 912 that may indicate where on the physical address on network that the packet 900 is intended to go. Depending on the network, a certain destination address or range of destination addresses may indicate that the packet 900 is a broadcast packet intended for more than one destination or any destination. Source address 914 may be the physical address of the originating sensor (the sensor device sending the packet 900). Channel 916 may indicate a certain type of communication or class of intended receivers on the network, and may, for example, indicate a broadcast channel intended for multiple or all receivers. Depending on the network, alternate embodiments of header 910 may include additional fields such as a checksum or an indication of the length of the data packet, for example measured in bytes.

Payload 950 may contain information related to a sensor event, related to the sensor itself, and related to the sensor's owner. Sensor ID 952 may be a unique ID of the sensor, and may enable a receiving hub or alert service to, for example, differentiate between multiple alarms from a single sensor and one alarm from each of multiple sensors. Alert service ID 954 may indicate a particular alert service, such as alert service A 124 of FIG. 1, that the broadcast packet is intended to reach. A sensor may know which alert service to send its alarms to, for example, either by configuration by the sensor's owner, or configuration by the manufacturer. The alert service ID may, for example, be an internet address or universal resource locator (URL) of the intended alert service. Device type 956 may specify what type of device is sending the packet, for example, it may specify a heat sensor or water sensor, or some combination of sensors types.

Event type 958 may specify a type of event that has occurred. For example, when a heat sensor senses that a temperature is above a certain alarm threshold. Event count 960 may indicate how many times the event of event type 958 has occurred or the number of broadcast event packets that have been sent in response to a single event. Event time 962 may indicate when the event specified in event type 958 occurred. Protocol for response 964 may indicate methods for a receiving device or service to communicating with the originating sensor. Sensor physical location 966 may include a physical street address where the sensor is installed (perhaps after being pre-configured by a sensor owner), or may include GPS coordinates determined automatically by the sensor at the time of the event. Sensor manufacturer 968 may indicate the manufacturing entity of the originating sensor, and may help in identifying a service or device capable of raising an alarm. Sensor owner 970 may indicate the person or entity that owns the originating sensor, for example as a text string, as a unique ID assigned by the manufacturer, or as a cell phone number of the owner. Sensor owner 970 may include information that a responsive device can use to identify who or how or where to raise an appropriate alarm. Certificate 972 may include encrypted information, such as a signed hash of the packet 900, from which a responsive device or alert service can authenticate the identity of the originating sensor and/or verify the integrity of the information in packet 900.

Event information 980 may be of variable size and may include additional information about the event. For example, event information 980 may include information that is specific to particular event type indicated in event type 958. For example, where the sensor is a heat sensor, and the event type is a high temperature alarm, the event information may include elements indicating the threshold temperature of the high temperature alarm, and the current temperature, and the amount of time that passed since the threshold temperature threshold was exceeded.

It should be understood that the various techniques described herein may be implemented in connection with hardware or software or, where appropriate, with a combination of both. The subject matter presented herein may be implemented as a computer process, a computer-controlled apparatus or a computing system or an article of manufacture, such as a computer-readable storage medium. The techniques, or certain aspects or portions thereof, may, for example, take the form of program code (i.e., instructions) embodied in tangible storage media or memory media implemented as storage devices, such as magnetic or optical media, volatile or non-volatile media, such as RAM (e.g., SDRAM, DDR SDRAM, RDRAM, SRAM, etc.), ROM, etc., that may be included in computing devices or accessible by computing devices. When the program code is loaded into and executed by a machine, such as a computer, the machine becomes an apparatus for practicing the disclosure. In the case of program code execution on programmable computers, the computing device generally includes a processor, a storage medium readable by the processor (including volatile and non-volatile memory and/or storage elements), at least one input device, and at least one output device.

One or more programs that may implement or utilize the processes described in connection with the disclosure, e.g., through the use of an application programming interface (API), reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

The present disclosure describes particular embodiments and their detailed construction and operation. The embodiments described herein are set forth by way of illustration only and not limitation. Those skilled in the art will recognize, in light of the teachings herein, that there may be a range of equivalents to the exemplary embodiments described herein. Most notably, other embodiments are possible, variations can be made to the embodiments described herein, and there may be equivalents to the components, parts, or steps that make up the described embodiments. For the sake of clarity and conciseness, certain aspects of components or steps of certain embodiments are presented without undue detail where such detail would be apparent to those skilled in the art in light of the teachings herein and/or where such detail would obfuscate an understanding of more pertinent aspects of the embodiments.

What is claimed:

1. A communication method, comprising:
    determining that data from a sensor of a sensor device indicates a time critical state; and
    sending a message over a communication protocol, wherein the message contains information indicative of a sensor device identifier and wherein the message provides information indicative that the message should be forwarded by a receiving hub that receives the message when the receiving hub has no pairing relationship with the sensor.

2. The method of claim 1, further comprising determining that the sensor device is not paired.

3. The method of claim 2,
    wherein determining that the sensor device is not paired comprises:
    sending a message indicative of an adverse condition to a first hub, wherein the first hub was previously paired with sensor device; and
    determining, after a timeout period, that an acknowledgement from the first hub of the message has not been received by the sensor device.

4. The method of claim 1,
    wherein the sensor device is determined to not be paired with a hub by examining a hub pairing state stored on the sensor device.

5. The method of claim 1,
    wherein, sending the broadcast message comprises at least one of:
    sending an alarm message to an unspecified address;
    sending a message to a specific address wherein the specific address indicates the message is intended for more than one recipient; and
    sending a message to a range of addresses.

6. The method of claim 1, wherein the sending a broadcast message to a network includes transmitting a wireless signal.

7. The method as recited in claim 1 wherein the sending a broadcast message to a network comprises transmitting a signal according to at least one of a plurality of protocols.

8. A hub apparatus, comprising:
    a receiver;
    a processor; and
    a memory comprising instructions that upon execution on the processor cause the hub at least to:

process, at least a portion of a message received from a sensor device over the receiver, wherein the sensor device has no pairing with the hub and wherein the at least a portion of the message is indicative of an adverse condition;

format a second message based at least in part on the at least a portion of the message into a packet acceptable to an alert service; and send the packet to the alert service over a network connection.

9. The hub apparatus as recited in claim 8, wherein the memory further comprises instructions that upon execution on the processor cause the hub at least to confirm by the alert service the authenticity of the sensor; and generate an alarm.

10. The hub apparatus as recited in claim 8, wherein the memory further comprises instructions that upon execution on the processor cause the hub at least to:

request a secure identity certificate from the sensor device; and forward the secure identify certificate to the alert service.

11. The hub apparatus as recited in claim 8, wherein the wireless receiver receives messages according to at least one of WiFi, Ethernet, Bluetooth, ZigBee, Zwave, Thread, or infrared communications protocols.

12. The hub apparatus as recited in claim 8, wherein the network connection comprises a TCP/IP connection.

13. The hub apparatus as recited in claim 8, wherein the memory further comprises instructions that upon execution on the processor cause the hub at least to:

determine that the message is indicative of an alarm message is based at least in part on a determination that the message has no destination address.

14. The hub apparatus as recited in claim 8, wherein the memory further comprises instructions that upon execution on the processor cause the hub at least to:

determine the alert service address based at least in part on information stored in the hub apparatus.

15. A sensor device, comprising a processor and a memory, the memory containing instructions that, upon execution on the processor, cause the sensor device at least to:

determine that data from a sensor of a sensor device indicates an adverse event state; and send a message over a communication protocol, wherein the message contains information indicative of a sensor device identifier and wherein the message provides an information indicative that the message is a broadcast message indicative of an adverse event state that should be forwarded by any hub that is capable of receiving the message when a receiving hub has no pairing relationship with the sensor.

16. The sensor device of claim 15, wherein the memory further comprises instructions that upon execution on the processor cause the sensor device at least to determine that the sensor device is not paired.

17. The sensor device of claim 16, wherein the instruction that determine that the sensor device is not paired comprises instructions that cause the sensor device at least to:

send the message to a first hub, wherein the first hub was previously paired with sensor device; and determine, after a timeout period, that an acknowledgement from the first hub of the alarm message has not been received by the sensor device.

18. The sensor device of claim 16, wherein the instruction that determine that the sensor device is not paired comprises instructions that cause the sensor device at least to examine a hub pairing state stored on the sensor device.

19. The sensor device of claim 1, wherein the instruction that send the broadcast message comprises instruction that cause the sensor device to do at least one of:

send the message to an unspecified address;

send a message to a specific address wherein the specific address indicates the message is a broadcast message and intended for more than one recipient; or send a message to an range of addresses.

20. The sensor device as recited in claim 15, wherein the instruction that send a broadcast message to a network comprises instructions for transmitting a signal according to at least one of a plurality of protocols.

* * * * *